(12) United States Patent
Cheng et al.

(10) Patent No.: US 11,021,874 B2
(45) Date of Patent: Jun. 1, 2021

(54) PVC BOARD AND METHOD OF MANUFACTURE

(71) Applicant: Taizhou Huali Plastic Co., Ltd., Jiangyan (CN)

(72) Inventors: Quanshan Cheng, Jiangyan (CN); Genxiang Xuen, Jiangyan (CN); Jun Yuan, Jiangyan (CN)

(73) Assignee: Taizhou Huali Plastic Co., LTD, Jiangyan (CN)

( * ) Notice: Subject to any disclaimer, the term of this patent is extended or adjusted under 35 U.S.C. 154(b) by 0 days.

(21) Appl. No.: 15/541,967

(22) PCT Filed: May 3, 2017

(86) PCT No.: PCT/CN2017/082829
§ 371 (c)(1),
(2) Date: Jul. 6, 2017

(87) PCT Pub. No.: WO2018/201309
PCT Pub. Date: Nov. 8, 2018

(65) Prior Publication Data
US 2020/0055289 A1    Feb. 20, 2020

(51) Int. Cl.
*E04C 2/20*    (2006.01)
*E04C 2/24*    (2006.01)
(Continued)

(52) U.S. Cl.
CPC ............ *E04C 2/205* (2013.01); *B32B 27/065* (2013.01); *B32B 27/08* (2013.01); *E04C 2/24* (2013.01);
(Continued)

(58) Field of Classification Search
CPC .............. E04C 2/20–246; E04F 15/105; E04F 15/107; B32B 5/18; B32B 5/20; B32B 27/065
See application file for complete search history.

(56) References Cited

U.S. PATENT DOCUMENTS 5,466,317 A * 11/1995 Lause ................. B29C 37/0082
                                                156/244.11
6,139,945 A * 10/2000 Krejchi ..................... B32B 5/18
                                                428/317.9
(Continued)

FOREIGN PATENT DOCUMENTS

CN       202265992 U      6/2012
CN       103362272 A     10/2013
(Continued)

OTHER PUBLICATIONS

Machine translation of CN 105908946 A, obtained from Espacenet (Year: 2020).*

(Continued)

*Primary Examiner* — Z. Jim Yang
(74) *Attorney, Agent, or Firm* — Offit Kurman, P.A.; Zhun Lu

(57) ABSTRACT

A novel PVC board and method of manufacture. The board provides shock absorption, temperature-insulation for energy saving, and noise-reduction advantages. The method of manufacture simplifies the production process, and improves production time and efficiency.

5 Claims, 9 Drawing Sheets

(51) Int. Cl.

| | | |
|---|---|---|
| *B32B 27/08* | (2006.01) | |
| *E04F 15/10* | (2006.01) | |
| *B32B 27/06* | (2006.01) | |
| *B32B 27/30* | (2006.01) | |
| *B32B 38/00* | (2006.01) | |

(52) U.S. Cl.
CPC .......... *E04F 15/105* (2013.01); *E04F 15/107* (2013.01); *B32B 27/304* (2013.01); *B32B 2038/0076* (2013.01); *B32B 2307/412* (2013.01)

(56) References Cited

U.S. PATENT DOCUMENTS

| | | | | |
|---|---|---|---|---|
| 2001/0041256 | A1* | 11/2001 | Heilmayr | B32B 27/30 |
| | | | | 428/318.6 |
| 2005/0227104 | A1* | 10/2005 | Kim | B32B 21/14 |
| | | | | 428/541 |
| 2006/0270298 | A1 | 11/2006 | Kuhn et al. | |
| 2009/0029107 | A1* | 1/2009 | Montiel | B29C 44/20 |
| | | | | 428/142 |
| 2013/0230687 | A1* | 9/2013 | Chen | B32B 27/08 |
| | | | | 428/116 |
| 2014/0227475 | A1* | 8/2014 | Yu | E04F 15/107 |
| | | | | 428/86 |
| 2014/0227484 | A1* | 8/2014 | Sung | B32B 27/304 |
| | | | | 428/147 |
| 2014/0329062 | A1* | 11/2014 | Song | E04F 15/107 |
| | | | | 428/201 |
| 2015/0267025 | A1* | 9/2015 | Fang | B32B 3/06 |
| | | | | 428/318.6 |
| 2015/0375471 | A1* | 12/2015 | Song | E04F 15/105 |
| | | | | 428/159 |
| 2016/0001527 | A1* | 1/2016 | Jiangang | B29C 48/40 |
| | | | | 428/215 |
| 2016/0167350 | A1* | 6/2016 | Kong | B32B 5/20 |
| | | | | 428/71 |
| 2016/0177579 | A1* | 6/2016 | Fang | C08J 9/0066 |
| | | | | 428/317.9 |
| 2016/0200034 | A1* | 7/2016 | Quanshan | B29C 48/0011 |
| | | | | 428/141 |
| 2016/0230399 | A1* | 8/2016 | Zhang | E04C 1/00 |
| 2016/0273231 | A1* | 9/2016 | Jiang | C08J 9/0066 |
| 2016/0281367 | A1* | 9/2016 | Jiang | B32B 7/12 |
| 2017/0144354 | A1* | 5/2017 | Lombaert | E04F 15/105 |
| 2017/0144418 | A1* | 5/2017 | Chen | B32B 3/08 |
| 2017/0183878 | A1 | 6/2017 | Zhang et al. | |
| 2017/0282493 | A1* | 10/2017 | Lee | B32B 17/1055 |
| 2017/0298639 | A1* | 10/2017 | Song | B29C 43/003 |
| 2017/0321435 | A1* | 11/2017 | Chen | B32B 37/12 |
| 2017/0370111 | A1* | 12/2017 | Troendle | B32B 25/12 |
| 2018/0044925 | A1* | 2/2018 | Koh | B32B 9/002 |
| 2018/0135313 | A1* | 5/2018 | Chen | B32B 3/06 |
| 2018/0141253 | A1* | 5/2018 | Yi | B32B 27/08 |
| 2018/0178487 | A1* | 6/2018 | Chen | B29C 43/24 |
| 2018/0207918 | A1* | 7/2018 | Dai | B32B 5/22 |
| 2018/0304601 | A1* | 10/2018 | Song | B32B 7/02 |
| 2018/0320388 | A1* | 11/2018 | Lombaert | B32B 5/18 |
| 2019/0001543 | A1* | 1/2019 | Dai | E04F 15/107 |
| 2019/0016865 | A1* | 1/2019 | Zhou | B29C 43/52 |
| 2019/0040635 | A1* | 2/2019 | Baert | B32B 37/04 |

FOREIGN PATENT DOCUMENTS

| | | | | |
|---|---|---|---|---|
| CN | 103362274 | A | | 10/2013 |
| CN | 104196202 | A | | 12/2014 |
| CN | 104895290 | A | | 9/2015 |
| CN | 104989069 | A | | 10/2015 |
| CN | 105133818 | A | | 12/2015 |
| CN | 10529257 | | | 2/2016 |
| CN | 105295256 | A | * 2/2016 | .......... B32B 27/065 |
| CN | 105908946 | A | * 8/2016 | .......... B32B 27/065 |
| CN | 106427165 | A | | 2/2017 |
| KR | 20100077133 | A | | 7/2010 |
| WO | 2015/101569 | A1 | | 7/2015 |

OTHER PUBLICATIONS

"Dry Production Technology of Ultrafine Heavy CaCo3" https://www.lcdri.com/news/heavy-calcium-carbonate/ (Year: 2017).*
U.S. Appl. No. 15/541,972, filed Jul. 6, 2017.
International Search Report With Written Opinion for International Application No. PCT/CN2017/082831, dated Feb. 5, 2018.
International Search Report and Written Opinion for International Application No. PCT/CN2017/082829, dated Feb. 27, 2018.
European search report and search opinion received for EP Application No. 17908539, dated Sep 9, 2020, 7 pages.

* cited by examiner

| | Thickness at $t_0$ (mm) | Thickness at $t_0$ (mm) | Thickness at $t_0$ (mm) | Rebound $(t_2 - t_1)/t_0$ | Average Rebound |
|---|---|---|---|---|---|
| With Comfort Layer | 5.40 | 4.83 | 5.19 | 6.67% | 6.00% |
| | 5.33 | 4.87 | 5.17 | 5.63% | |
| | 5.44 | 4.90 | 5.21 | 5.70% | |
| Without Comfort Layer | 4.60 | 4.38 | 4.45 | 1.52% | 2.20% |
| | 4.49 | 4.34 | 4.44 | 2.23% | |
| | 4.54 | 4.35 | 4.48 | 2.86% | |

FIG. 5B

PVC BOARD AND METHOD OF MANUFACTURE

CROSS-REFERENCE TO RELATED APPLICATIONS

This application is a national stage application (under 35 U.S.C. § 371) of PCT/CN2017/082829, filed May 3, 2017, which is incorporated herein by reference in its entirety.

FIELD OF THE INVENTION

The present invention belongs to the technical field of engineered panels as building materials, and more particularly to a new type of PVC board and method of manufacture.

BACKGROUND OF THE INVENTION

Polyvinyl chloride (PVC) is a well-known synthetic polymer. PVC has many qualities that make it a desirable building material. For example, it can be manufactured to be rigid or with a range of flexibility, it is resistant to moisture and mildew, it is waterproof and easily washable, and it is very durable. Rigid PVC is commonly used in construction for piping, doors and windows, and other applications where it replaces wood, metal, and other rigid materials. In the prior art, PVC is made flexible by adding plasticizers to the mixture of PVC components during manufacture. The most widely used plasticizers are phthalates, (which recent research has determined are toxic). In its flexible form, PVC is used in electrical cable insulation, imitation leather, signage, and other applications where it can take the place of rubber, leather, and other non-rigid materials. PVC is also resistant to impacts, aging, cracking, warping, and discoloration.

Because of its desirable characteristics, PVC has many commercial uses. For example, sheets of PVC are used as a flooring material, interior paneling, and exterior siding. As a flooring material, PVC is comfortable to walk on, and can have a very durable surface layer that resists slipping, even when wet. It can be produced to have a rich variety of colors, designs, and simulations of other materials. For example, PVC flooring is available that is similar in appearance to carpet, stone, wood, and tile, including a surface that can be embossed to enhance the realism of the simulation. The surface may alternatively be made flat, with a rough, matte, or glossy finish. PVC sheets can also be manufactured to have one or more visible design layers to achieve various effects, using a very broad palette of colors in virtually any hue, saturation, and tone from muted to brilliant. Adjacent contrasting areas can be formed and/or machined to have very precisely controlled shapes and colors.

Because of all of these traits, PVC board is superior to other common construction materials, particularly inside wall paneling and flooring material, and can give full play to designer creativity. It can meet the unique needs of virtually any decor. In addition, PVC can be made to be sound absorbent, reducing ambient noise by as much as 20 decibels; and can be made to mitigate noise from percussion events such as walking in high heels. This makes PVC particularly suited to quiet environments such as hospitals, libraries, lecture halls, theaters, and the like.

Moreover, PVC is easy to work with. As a wood replacement, it can be worked like wood by drilling, sawing, nailing, planing, gluing, and other processing; and it provides similar performance, such as nail holding power. Products made of PVC are also normally at least as easy to install as those made with other materials. It is strong and light, and parts with mating connections can easily be assembled with adhesive made for bonding PVC and, in a relatively short time, the bond is as strong as the PVC body.

However, PVC production in the prior art is complicated. It requires a large number of processing steps, all of which must be tightly controlled and performed in a set order. For example, producing PVC boards generally involves mixing together in separate steps PVC powder, plasticizers, stabilizers, lubricants, fillers, and other raw materials. At each step, the materials must be completely and uniformly mixed to produce a consistent mixture. After the PVC material is produced, forming it into finished products typically entails first making sheets of PVC. This also requires numerous ordered steps, involving rolling semi-finished product into component sheets, combining the sheets in one or more separate processes resulting in a finished sheet that has many layers, and processing the layered sheets into finished products. If the layers are not firmly affixed to each other, they may separate, bubble, crack, or otherwise be of a lesser quality than desired.

Existing PVC production methods generally include separate steps for mixing, stabilizing, sealing, curing, tempering, coating, laminating, and more. Combining and mixing constituent raw materials, such as PVC powder, plasticizers, stabilizers, lubricants, fillers and others, typically must be added in a certain order. Products having layers with different characteristics require each layer to be mixed separately from the others. Each such layer may be milled into an intermediate stage by rolling the PVC into sheets, and the sheets must then be combined in a certain order, and fused together into a combined sheet, often by one or more heating steps. The combined sheet is then typically cut to shape and molded to form if needed. The PVC may be cured under ultraviolet light, and may be tempered by a plurality of heating, stretching, and cooling steps. In some applications, the PVC must also be laminated. Further steps can include forming designs or patterns on one or more layers, texturing one or more surfaces, and the like. Thus, the PVC manufacturing process is quite complex.

SUMMARY OF THE INVENTION

A novel PVC board and method of manufacture. The board provides shock absorption, temperature-insulation for energy saving, and noise-reduction advantages. The method of manufacture simplifies the production process, and improves production time and efficiency.

BRIEF DESCRIPTION OF THE DRAWINGS

The particular features and advantages of the invention as well as other objects will become apparent from the following description taken in connection with the accompanying drawings in which:

FIG. 5A is a flow chart of a procedure for measuring the rebound ability of a flooring material comprising a layer fabricated to be comfortable to walk on.

FIG. 5B is a table showing the results of the procedure of FIG. 5A.

DETAILED DESCRIPTION

Figure 1:
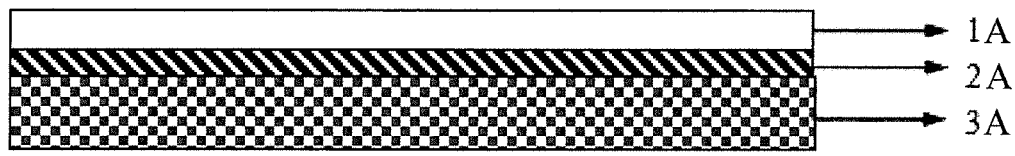
FIG. 1 is a side view of a first embodiment of an exemplary engineered board according to the invention.

A new PVC board and a method of manufacture are disclosed and described. In a first exemplary embodiment, the PVC board is a composite with three layers. As shown in FIG. 1, the layers from top to bottom are 1A an impact resistant, transparent PVC wear layer; 2A a PVC film layer visible through the transparent wear layer that displays one or more colors, shapes, patterns, and/or simulations of other materials; and 3A a PVC bottom, or base, layer that contains a flexible PVC impact modifier. The wear layer may be provided with various finishes, including smooth, matte, textured, or embossed. The base layer may be a solid or foam layer of PVC, and may also be provided with a bottom surface treatment such as embossing, for example, to support ease of installation using adhesives.

In the case the base layer is solid, it comprises by weight: 100 parts of polyvinyl chloride (PVC) resin, 4-20 parts of PVC elastomeric impact modifier, 0-400 parts of calcium carbonate, 6-8 parts of calcium/zinc compound stabilizing agent, and 1.0-2.0 parts lubricant.

In the case the base layer is foam, it comprises by weight: 100 parts of PVC resin, 4-20 parts of PVC elastomeric impact modifier, 0-300 parts of calcium carbonate, 6-8 parts of calcium/zinc compound stabilizing agent, 0.2-1.0 parts foaming agent, 4-8 parts foaming regulator, and 1.0-2.0 parts lubricant.

In addition, a novel method for producing a multi-layered composite sheet of PVC is disclosed and described. In an exemplary embodiment, the method produces a composite sheet having three layers permanently fused together. The three layers include a bottom PVC base layer which may be either a solid layer or a foam layer in accordance with one of the above formulas. A PVC presentation layer is formed adjacent to the base and fused permanently to the base layer, providing one or more colors, shapes, designs, and/or visual simulations of other materials such as wood, tile, etc. The third layer is an impact resistant transparent PVC wear layer through which the display layer is visible. It is formed adjacent to the display layer and fused permanently to the display layer. In embodiments, the wear layer may be provided with a desired finish, which may be smooth, matte, rough, textured, grooved, or embossed to simulate the surface of a material visually simulated by the display layer to which it is fused.

Figure 2A:
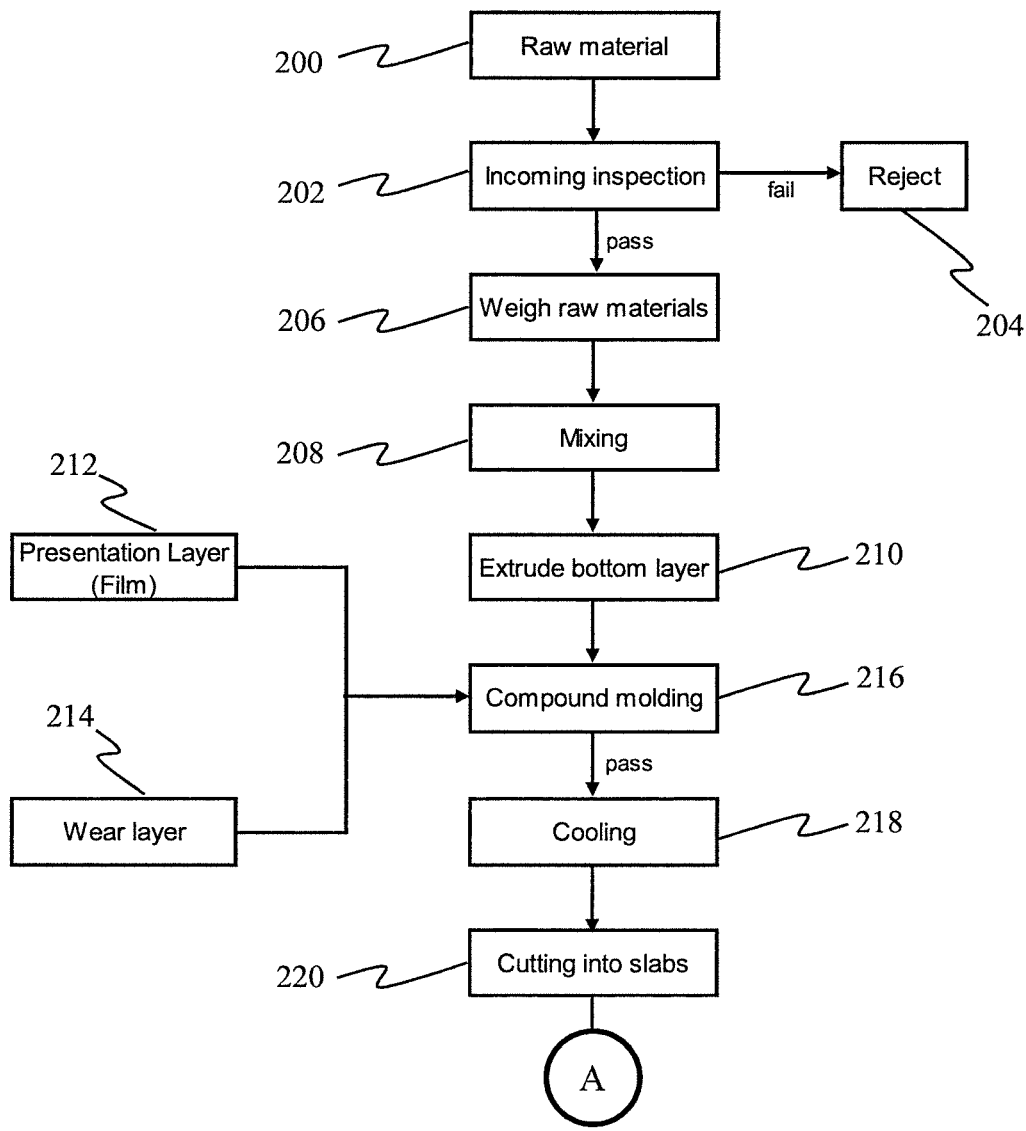
FIGS. 2A-2B are a flow diagram of a method of manufacturing the board of FIG. 1, according to the invention.
Figure 2B:
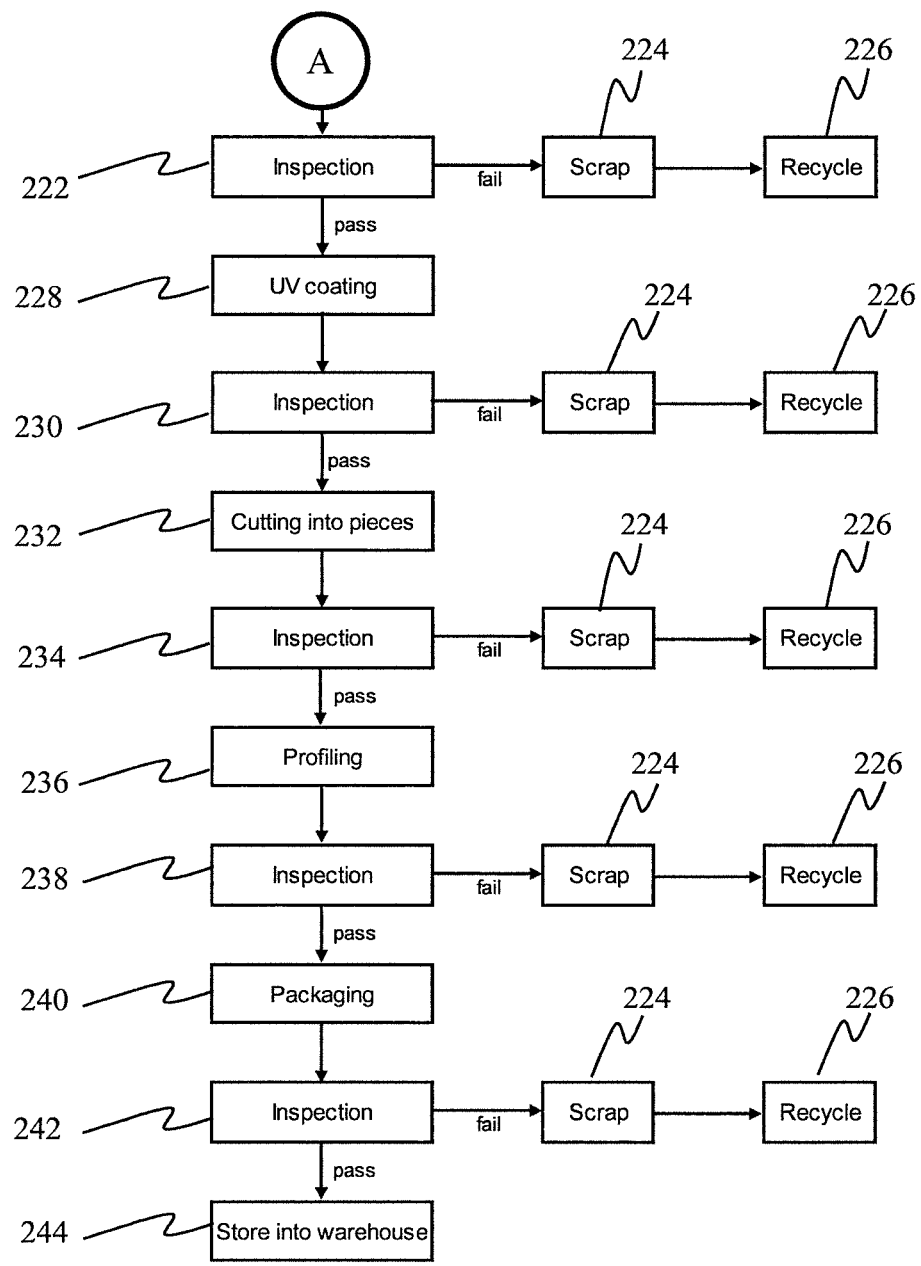

FIGS. 2A-2B are a flow diagram showing an exemplary embodiment of the method of forming a composite PVC board. As shown, the method begins by receiving the raw material, 200, from which the PVC board will be made. The raw material is inspected, 202, and if it fails inspection it is rejected, 204. If the raw material passes the incoming inspection, the parts by weight specified in at least one of the formulas above are weighed, 206, and placed into a mixer for mixing, 208. Preferably, during mixing in the mixer the materials are heated to a temperature at which they can flow to facilitate forming a homogeneous mixture, then cooled until viscous and ductile. In an embodiment, the PVC mixture is heated to between 100-130° C., and preferably to 110-120° C. The mixture is then cooled to a reduced temperature while continuing to stir, until the mixture is in a viscous ductile state. In an embodiment, the heated mixture is cooled to between 30-50° C., and preferably to 35-45° C., and more preferably to about 40° C. Next, the cooled ductile material for the PVC base layer is extruded into a flat, uniform sheet, 210, preferably onto a surface that moves relative to the extruder. A twin screw extruder may be used, preferably maintained at a temperature in the range of 150° C.-180° C.

Similar processes (not shown) are also performed for the PVC film layer, 212, and for the transparent PVC wear layer, 214. The processing of all three layers is coordinated so they are processed separately but during the same manufacturing process. Then, the three ductile layers are molded together, 216, which permanently fuses the layers together into a thin sheet of compound layered material. Alternatively, the ductile product may be molded into a desired profile. The sheet is then further cooled, 218. The compound sheet is then cut into slabs, 220. FIG. 2A merges into FIG. 2B by matching the circled "A" at the bottom of 2A with the circled "A" at the top of FIG. 2B.

Referring now to FIG. 2B, after cutting, the slabs of compound material are inspected, 222. For example, they may be inspected to check the uniformity of the material in terms of physical properties such as thickness, transparency of the top layer, appearance of the film layer, flexibility, and/or compressibility provided by the base layer, for example. If a slab fails the inspection, it may be scrapped, 224, and recycled, 226. For example, the material may be shredded or pelletized and used as a component of a subsequently manufactured product that can use the mixture of raw materials by weight that make up the scrapped material. The material may be inspected again after one or more subsequent manufacturing stages, and material that fails those inspections may be similarly scrapped, 224, and recycled, 226.

In an embodiment, the slabs that pass the inspection are provided with an ultraviolet (UV) coating, 228, which may be sprayed onto the slabs, for example, and cured under UV light. The coated slabs may then be inspected again, 230. Materials that fail inspection may be scrapped, 224, and recycled, 226, as before. The coated slabs that pass inspection may then be cut into the pieces that will make up the finished product, 232, and inspected again, 234. Materials that fail inspection may be scrapped, 224, and recycled, 226, as before.

In an embodiment, the pieces that pass the inspection may be finished, such as by machining one or more edges and/or surfaces of the pieces, for example. The finished pieces may then be inspected again, 238. Materials that fail inspection may be scrapped, 224, and recycled, 226, as before. The finished pieces that pass inspection constitute the finished product. These may be packaged, 240, and inspected again, 242. Materials that fail inspection may be scrapped, 224, and recycled, 226, as before. Finally, the packaged finished pieces that pass this final inspection may be stored in a warehouse, 244, or otherwise prepared for shipping.

In summary, an embodiment is described above in which a PVC flooring material is manufactured simply and efficiently, with only three layers and in a single production line. The PVC material of each of the three layers is mixed, heated, and cooled separately from the others. The layers are then extruded in separate extruders one on top of the other in a single processing step while they are all in a hot viscous state. The extruders may be twin screw extruders, maintained at a constant hot temperature to maintain the ductile state of each layer so that it fuses to the adjacent layers.

In an embodiment, the layers are extruded onto a moving surface of a single production path, for example onto a rotating drum. The base layer may be extruded and fed into a first set of hot rollers, flattening it into a thin sheet. The second, presentation layer may be extruded onto or adjacent to the still-ductile base layer as it moves along the production path. Because of their hot ductile state when the two sheets meet, they fuse together permanently forming a two-layer composite sheet. In an embodiment, another set of rollers may further flatten and fuse the two-layer composite sheet. Finally, the wear layer material may be extruded onto or adjacent to the presentation layer. Again, because of the hot ductile state of the wear layer and the presentation layer when they meet, the two sheets fuse together permanently, forming a three-layer composite sheet. In an embodiment, the three layers can be joined in a single step by feeding them from three different directions at the same velocity, e.g., from left, right, and directly above. The three extruded sheets may then be rolled together and fused. In another embodiment, a different set of rollers may introduce each of the three layers into the production path. For example, the base layer may be extruded first, then the presentation layer can be extruded atop the base layer, forming a two-layer composite. The two-layer composite may be fed into a set of rollers to flatten and fuse them together. Or, the wear layer may be extruded onto the presentation layer forming a three-layer composite sheet, with the wear layer on top. The three-layer composite may then be passed through another set of rollers to flatten and fuse the layers together. In either case, all three layers are thus flattened and permanently fused to each other in a single production path.

In embodiments, heating the three mixtures of PVC materials involves separately heating each mixture to between 100-130° C., and preferably to 110-120° C. The mixtures are then cooled to a reduced temperature while continuing to stir, until they are in a viscous ductile state. In an embodiment, each of the stirring mixtures is cooled to between 30-50° C., and preferably to 35-45° C., and more preferably to about 40° C. At this temperature each material thickens into a viscous ductile state. This ductile material is then fed into a twin screw extruder before being fed into rollers as described above.

In embodiments, a composite sheet or panel may be formed as described above, but with additional processing steps. Such steps may be performed as the material moves through the production line, still within a single production process. Such processing steps may include, for example, in an embodiment, tempering the composite material by one or more additional heating—cooling steps, and/or pulling and stretching steps, at any appropriate point in the production line. The composite may also be cut, molded, pressed, profiled, planed, polished, and/or otherwise machined, to form any desired profile or other desired solid or hollow shape. The product can also be provided with any desired surface simulation or finish in one or more additional process steps. For example, straight lines may be etched into the surface, and/or the surface may be processed to provide a smooth, matte, or rough finish, textured, embossed, corrugated, etc. Thereby, a virtually unlimited number of finished products may be produced.

Although composite sheets with three distinct layers have been described above, the form of the finished product does not need to be a sheet, and it does not need to have three layers. Instead, any number of layers can be formed into any number of shapes by including the needed steps in the manufacturing process. Nevertheless, one currently preferred embodiment produces a flat PVC panel having three layers suitable for use as a flooring material, as described.

In the foregoing PVC mixture descriptions, it is emphasized that a non-toxic impact modifier is used to provide shock absorbency instead of a plasticizer. This can result in a more resilient floor that provides better environmental performance. By the above method, after cooling and molding the composite PVC panel, it may be cut to form large wall or floor panels.

Figure 3:
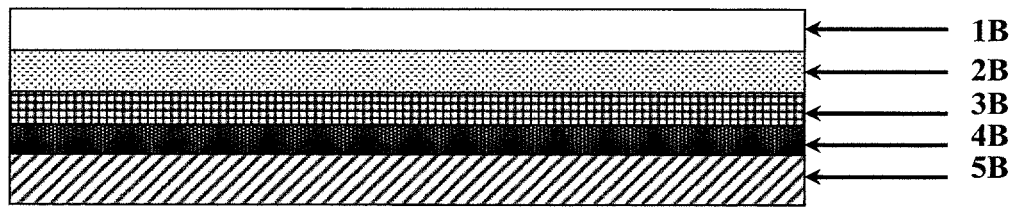
FIG. 3 is a side view of a second embodiment of an exemplary engineered board according to the invention.

Alternate embodiments, formulations, and methods of manufacture include the following. In another exemplary embodiment, the PVC board is a composite with five layers. As shown in FIG. 3, the layers from top to bottom are 1B, a polyurethane (PU) coating; 2B, an impact resistant, transparent PVC wear layer; 3B, a PVC film layer visible through the transparent wear layer that displays one or more colors, shapes, patterns, and/or simulations of other materials; 4B, a cushioned elastic comfort layer; and 5B, a PVC bottom, or base, layer that contains a flexible PVC impact modifier.

Layers 2B, 3B, and 5B may be the same or similar to layers 1A, 2A, and 3A, respectively, described previously. As before, the wear layer may be provided with various finishes, including smooth, matte, textured, or embossed. The base layer may be a solid or foam layer of PVC, and may also be provided with a bottom surface treatment such as embossing, for example, to support ease of installation using adhesives. In addition, soft layer 4B is added to improve foot comfort and to reduce noise; and a polyurethane (PU) coating 1B is added to protect against surface dirt. PU is strong, easy to clean, and requires little or no maintenance. The PU may be applied as a liquid or aerosol directly to the wear layer 2B after it is formed. Alternately, the PU layer may be formed independently as a separate layer and then included in the method, as follows.

The polyurethane (PU) layer 1B is a floor coating cured under ultraviolet light forming a layer that is resistant to wear and easy to clean. The soft layer 4B is an elastomer layer of polyvinylchloride or modified environmental plasticizer composite, specific parts by mass as follows: 100 PVC resin, elastomers or plasticizer 20-60, calcium zinc composite stabilizer 2-6, calcium carbonate 0-500.

In an exemplary embodiment, the method of manufacture produces a composite sheet having five layers permanently fused together. Each of the layers is formed separately, and selected and assembled to provide PVC boards having the desired properties. In this exemplary embodiment, the five layers include a bottom PVC base layer which may be either a solid layer or a foam layer in accordance with one of the formulas previously described. A soft layer may be separately formed and placed adjacent to the base for comfort and noise suppression. A PVC presentation layer may be made separately and placed adjacent to the soft layer to provide one or more colors, shapes, designs, and/or visual simulations of other materials such as wood, tile, etc. The next layer may be an impact resistant transparent PVC wear layer through which the display layer is visible. And a PU layer or top coat may be applied directly to the upper surface of the wear layer, or may be independently formed into slabs and assembled adjacent to the wear layer. In embodiments, the wear layer may be provided with a desired finish, which may be smooth, matte, rough, textured, grooved, or embossed to simulate the surface of a material visually simulated by the display layer to which it is fused.

This exemplary novel manufacturing method of the present invention includes obtaining a plurality of slab layers selected for their specific physical characteristics, assembling the layers in a select order, and hot-pressing the assembled layers to fuse them together as a compound plate. Multiple compound plates comprising the same or different component layers may be assembled in the same or different orders. The compound plates comprising select component layers may be separated from each other by non-fusing coatings or layers to form a plurality of compound plates in a single hot-pressing step. The compound plates formed may have the same or different component layers assembled in the same or different order. In a currently preferred embodiment, a plurality of component layers each having different formulations and physical characteristics may be made available for selection and inclusion in a compound plate. The component layers may include, for example, a PU layer for resisting surface dirt and ease of maintenance; a shading plate; any number of PVC plates of the same or different thicknesses to provide a substrate to the compound plate; any number of soft material plates of the same or different thicknesses to provide a springy quality to the compound plate for comfort and/or noise suppression; any number of film layers of any desired color, pattern, image, transparency, or the like as a compound display layer; a PVC transparent wear layer of any desired thickness, and a surface plate that may have an embossed outer surface. The plates are assembled in any desired order and placed in a hot press together, subjected to a fusing step at a select pressure and temperature for a select time, and then a cooling step at a different select pressure and temperature for a select time. For example, a fusing step pressure of 4-8 MPa, temperature of 130-160° C. for 30-50 minutes, and a subsequent cooling step pressure of 8-12 MPa for 25-40 minutes. A plurality of first fusing and cooling steps may be applied to assembled select component layers to form compound component layers, then the compound component layers may be included in further assemblies to form further component layers or finished compound plates.

In an embodiment, a component compound layer may be formed of a PVC substrate layer, a soft layer, a simulation pattern PVC film, and a PVC transparent wear layer to form a 4-layer composite structure. This structure may then be laminated with a PU coating and further processed to form a 5-layer compound plate. Or, the method of manufacture may include a hot pressing step in which a transparent wear layer is added to a surface plate having an embossed surface and one or more presentation films to emulate a desired material.

In an embodiment, the method of the production method of the PVC layer may be formed by feeding raw material into a mixer, heated and stirred to form a PVC hot mix. The PVC mix may then be cooled to a certain temperature and extruded in a PVC twin screw extruder. Compound component layers may be formed by three-roll hot roll forming, cooling, and molding, as previously described. The compound component layers may then be cut into component plates of a desired size. In an embodiment, this manufacturing method may include mixing raw PVC material in the mixer while stirring and heating to 110-120° C., cooling the hot mixture while stirring to 40° C., then extruding the cooled PVC mixture in a twin screw extruder.

In an embodiment, PVC siding may be formed by cutting the finished compound plate into boards of a desired size. In an embodiment, PVC flooring may be formed by cutting the finished compound plate into boards and machining the board edges into shapes that fit together as a slotted floor.

Figure 4A:
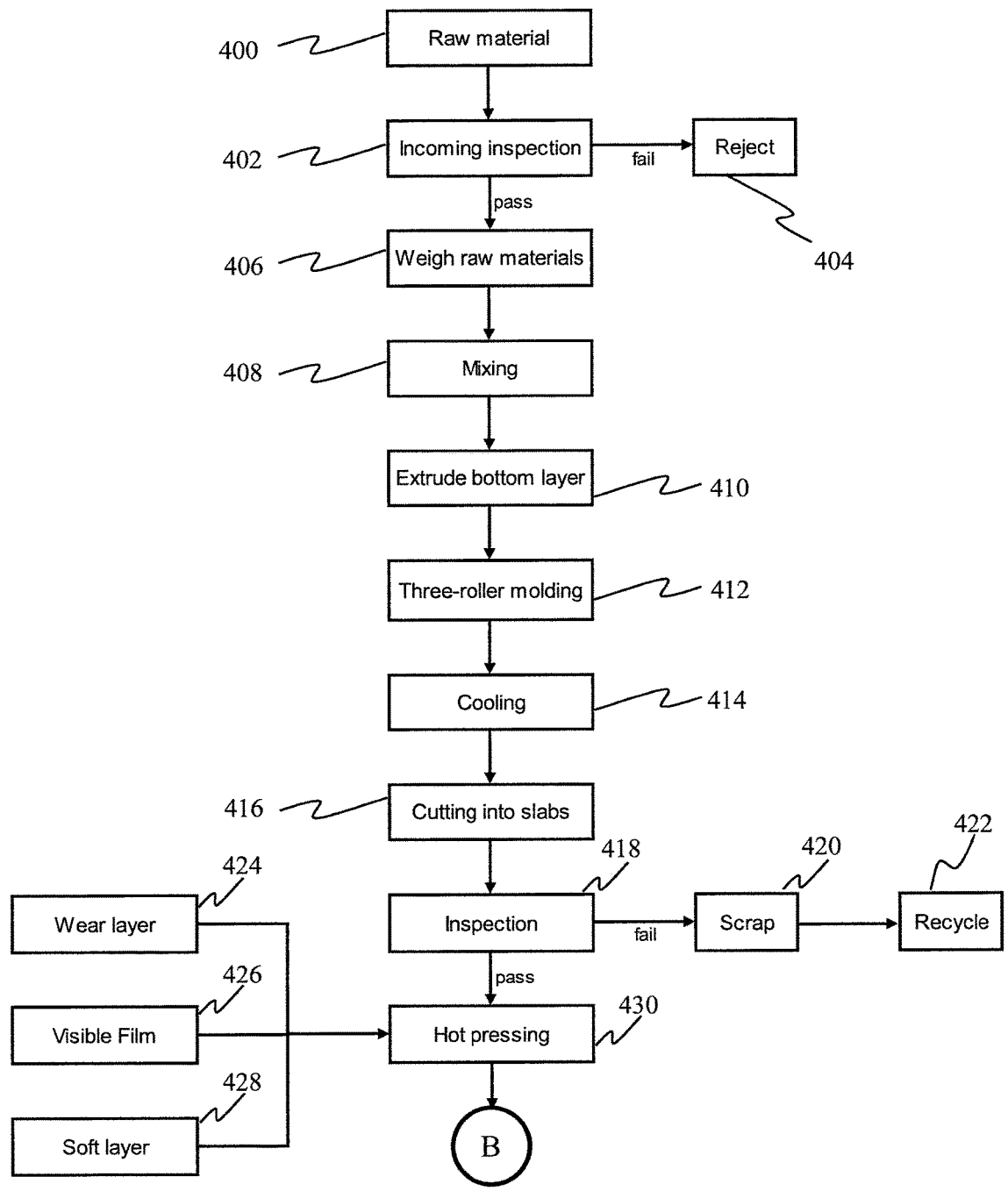
FIGS. 4A-4B are a flow diagram of a method of manufacturing the board of FIG. 3, according to the invention.
Figure 4B:
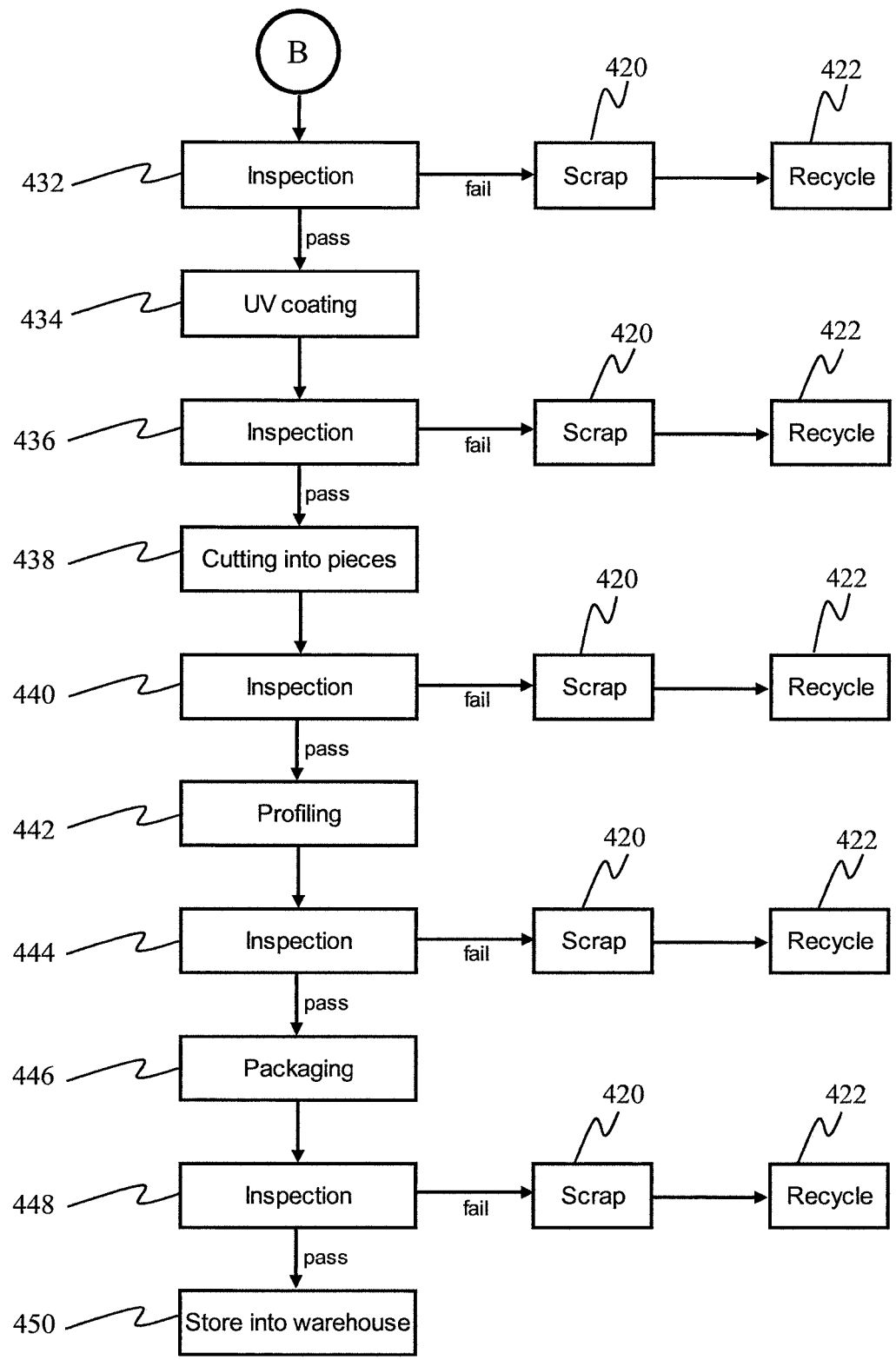

FIGS. 4A-4B are a flow diagram showing another exemplary method of forming a composite PVC board, such as the PVC board of FIG. 3. As shown, the method begins by receiving the raw material, 400, from which at least one layer of the finished PVC board will be made. The raw material is inspected upon receipt, 402, and if it fails inspection it is rejected, 404. If the raw material passes the incoming inspection, the parts by weight specified in at least one of the formulas previously described are weighed, 406, and placed into a mixer for mixing, 408. Preferably, during mixing in the mixer the materials are heated to a temperature at which they can flow to facilitate forming a homogeneous mixture, then cooled until viscous and ductile. In an embodiment, the PVC mixture may be heated to between 100-130° C., and preferably to 110-120° C. The mixture may then be cooled to a reduced temperature while continuing to stir, until the mixture is in a viscous ductile state. In an embodiment, the heated mixture may be cooled to between 30-50° C., and preferably to 35-45° C., and more preferably to about 40° C. Next, the cooled ductile material for the PVC bottom layer is extruded into a flat, uniform sheet, 410, preferably onto a surface that moves relative to the extruder. A twin screw extruder may be used, preferably maintained at a temperature in the range of 150° C.-180° C.

A component plate (corresponding to layer 5B in FIG. 3, for example) may then be formed by molding 412, cooling 414, and cutting into slabs 416. Although three-roller molding is illustrated in the figure, other molding configurations may be used, such as two-roller molding. The slabs may be inspected 418, and those that fail may be scrapped 420, and recycled 422, as they may also be in subsequent inspections. Slabs that pass inspection can be combined by hot pressing 430 together with one or more other pre-formed slab layers, such as a wear layer 424 (corresponding to layer 2B), a visible film layer 426 (corresponding to layer 3B), and/or soft layer 428 (corresponding to layer 4B). These layers may be formed independently in processes comprising steps similar to steps 400-422. The forming of the component layers need not be coordinated, except that the components forming the compound slabs must be available for assembly. During the hot pressing step, the assembled layers are permanently fused together into slabs of compound layered material.

FIG. 4A merges with FIG. 4B by matching the circled "B" at the bottom of 4A with the circled "B" at the top of FIG. 4B. The compound slabs formed in step 430 are inspected 432, and those that fail may be scrapped and recycled. In this embodiment, those that pass inspection are provided with an ultraviolet (UV) coating 434 (corresponding to layer 1B of FIG. 3). This coating may be one or both of a layer that is cured by applying UV light, or a coating that will protect the finished product from the effects of UV light, such as discoloration, that may be the result of prolonged exposure to sunlight when the finished board is in use. The UV coated slabs are again inspected, 436. Those passing inspection are cut into pieces 438 appropriate for the finished product being manufactured, and the pieces are inspected 440. Those passing inspection may be subjected to a profiling step 442, to give them one or more edges having a desired profile. One or more of the edges may be squared off and smoothed. Alternatively, one or more of the edges may be given a profile that may interlock during assembly with the profile of the edge of adjoining pieces when assembled.

The profiled pieces are again inspected 444, packaged 446, and given one last inspection 448 before being stored 450 or delivered.

The component slabs may be selected and assembled to provide a finished product having desired physical properties. For example, the finished product may be formed to have a desired thickness, appearance, flexibility, and/or compressibility by selecting the necessary layers.

In summary, the embodiment described above provides a PVC-based product that may be manufactured simply and efficiently, with any desired number of layers that provide any desired combination of the layers' physical characteristics, in a single production line. In embodiments, composite slabs or pieces may be formed as described above, but with additional processing steps. Such steps may be performed as the material moves through the production line, still within a single production process. Such processing steps may include, for example, tempering the composite material by one or more additional heating-cooling steps, and/or pulling and stretching steps, at any appropriate point in the production line. The composite may also be cut, molded, pressed, profiled, planed, polished, and/or otherwise handled, to form any desired profile or other desired solid or hollow shape. The product can also be provided with any desired surface simulation or finish.

Figure 5A:
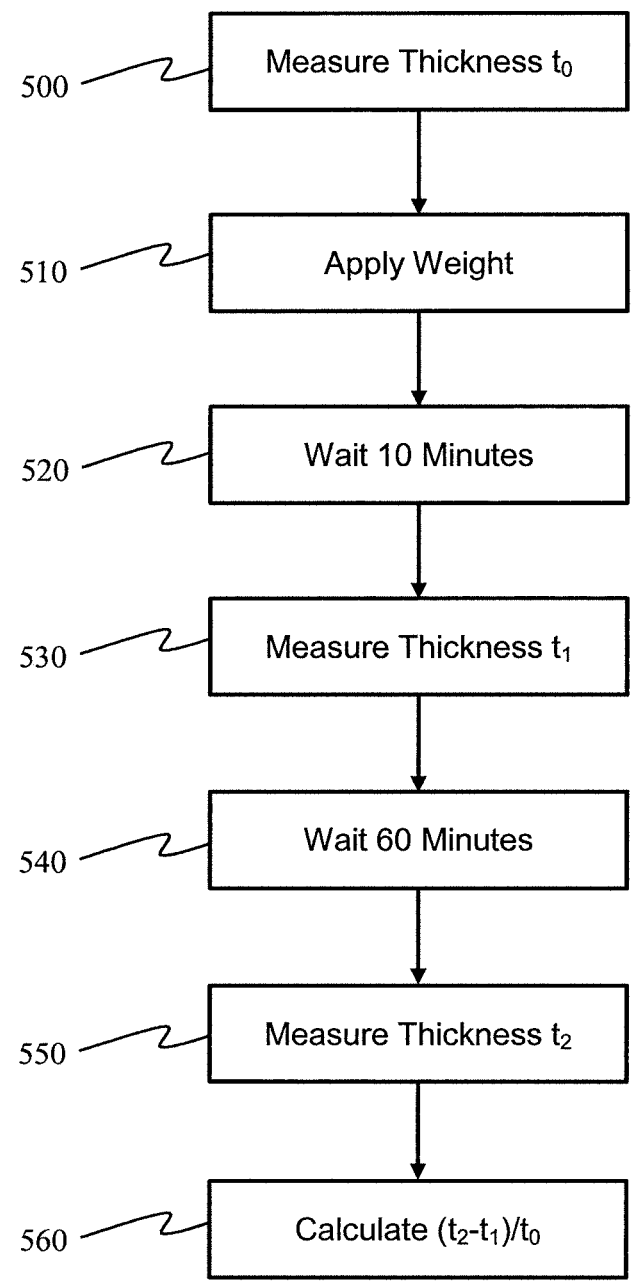

FIG. 5A illustrates a novel testing method that was performed in August 2016 to demonstrate and quantify the rebounding characteristics of flooring material that includes a soft comfort layer as previously described, and to compare the result to the rebound characteristics of flooring of similar structure but without the comfort layer. Thus, the material tested included flooring material samples with and without the comfort layer. Three samples of each type of flooring were tested, and the results of the three tests were averaged for both types of floor material.

The samples measured approximately 8 mm×8 mm, and were all nominally 5 mm thick. During the test, the thickness of the samples was measured, accurate to within 0.01 mm. The testing procedure performed on each sample began by measuring the initial thickness of the sample, 500, designated to. A load of 90 KG was then set on top of the sample, 510, to mimic the effect on the material of a person standing on a floor made of the material. The load was fully rested on the sample within a five second time period, and a timer was started within two seconds of the entire load being at rest on the sample. After 10 minutes, the load was removed, 520, and the thickness of the sample was measured, 530, designated $t_1$. The sample was then left unloaded for 60 minutes, 540, and its thickness measured again, 550, designated $t_2$. The percentage rebound was then calculated, 560, as 100× $(t_2-t_1)/t_0$. The results were averaged for the three samples of both types of floor.

FIG. 5B is a table showing the measurements. The flooring material with the comfort layer was found to rebound 6.00%; whereas the flooring without the comfort layer rebounded only 2.20%. Thus, the floor with the comfort layer should approximate the feel of a carpet having a thin pile, which is much more comfortable than the hard unyielding floor, while remaining as easy to clean and maintain as the hard floor.

Figure 6:
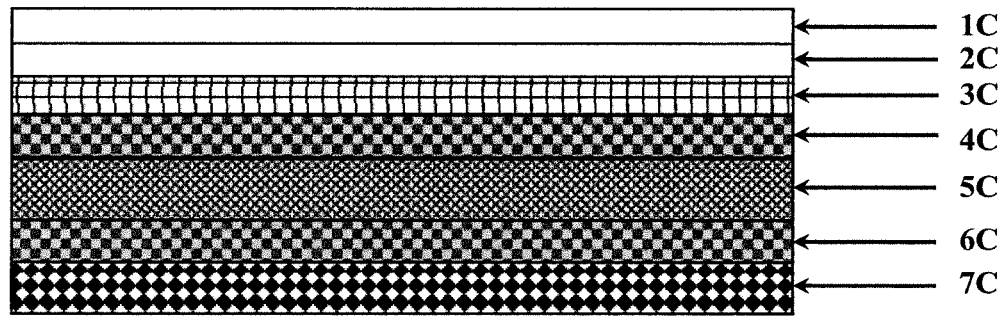
FIG. 6 is a side view of a third embodiment of an exemplary engineered board according to the invention.

In yet another exemplary embodiment, a composite PVC board may be produced that has seven layers. As illustrated in FIG. 6, the layers from top to bottom may be: 1C, an ultraviolet (UV) coating; 2C, a PVC wear layer; 3C, a presentation layer (e.g., a pattern film); 4C, a first co-extruded layer; 5C, a second co-extruded layer (e.g., a micro-foam layer); 6C, a third co-extruded layer; and 7C, a self-priming soft layer. As shown, layers 4C and 6C may use the same formula and sandwich layer 5C between them. For example, layers 4C and 6C may comprise a mixture of polyvinyl chloride (PVC) resin, PVC elastic impact modifier, calcium carbonate, calcium and zinc composite stabilizer and lubricant. These constituents may be mixed in the following specific parts by weight:

100 parts of polyvinyl chloride (PVC) resin;
0-10 parts PVC elastic impact modifier;
100-200 parts of calcium carbonate;
5-7 parts calcium and zinc complex stabilizer; and
1.0-2.0 parts lubricant.

In the embodiment shown in FIG. 6, layer 5C (the second co-extruded layer) may be a micro-foam layer, combining polyvinyl chloride (PVC) resin, PVC elastic impact modifier, calcium carbonate, calcium and zinc compound stabilizer, foaming agent, foaming agent and lubricating agent. These constituents may be mixed in the following specific parts by weight:

100 parts of polyvinyl chloride (PVC) resin;
0-10 parts PVC elastic impact modifier;
100-150 parts calcium carbonate;
5-8 parts calcium and zinc compound stabilizer;
0.2-1.0 parts foaming agent;
0-8 parts foam adjusting agent; and
1.0-2.0 parts lubricant.

The other layers 1C-3C and 7C, may be the same or similar to layers 1B-3B and 5B respectively, described previously. As before, the wear layer may be provided with various finishes, including smooth, matte, textured, or embossed. The base layer may be a solid or foam layer of PVC, and may also be provided with a bottom surface treatment such as embossing, for example, to support ease of installation using adhesives. In this embodiment, the soft layer 4B that was added to improve foot comfort and to reduce noise has been replaced with the sandwich layers 4C-6C described above. These layers provide shock absorption, temperature insulation, and noise suppression, thereby providing an enclosed space that is quieter and less expensive to heat and cool.

Figure 7A:
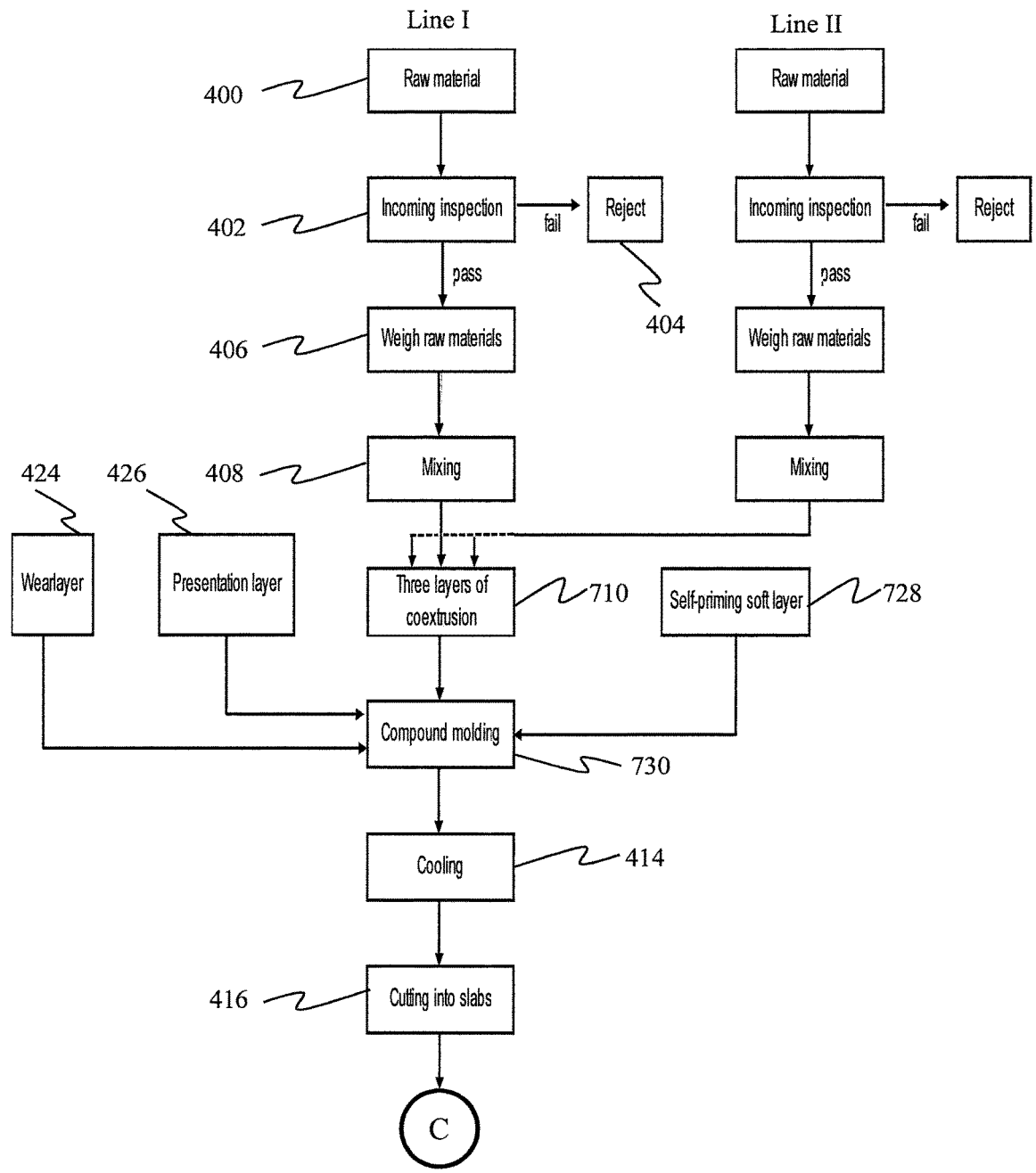
FIGS. 7A-7B are a flow diagram of a method of manufacturing the board of FIG. 6, according to the invention.
Figure 7B:
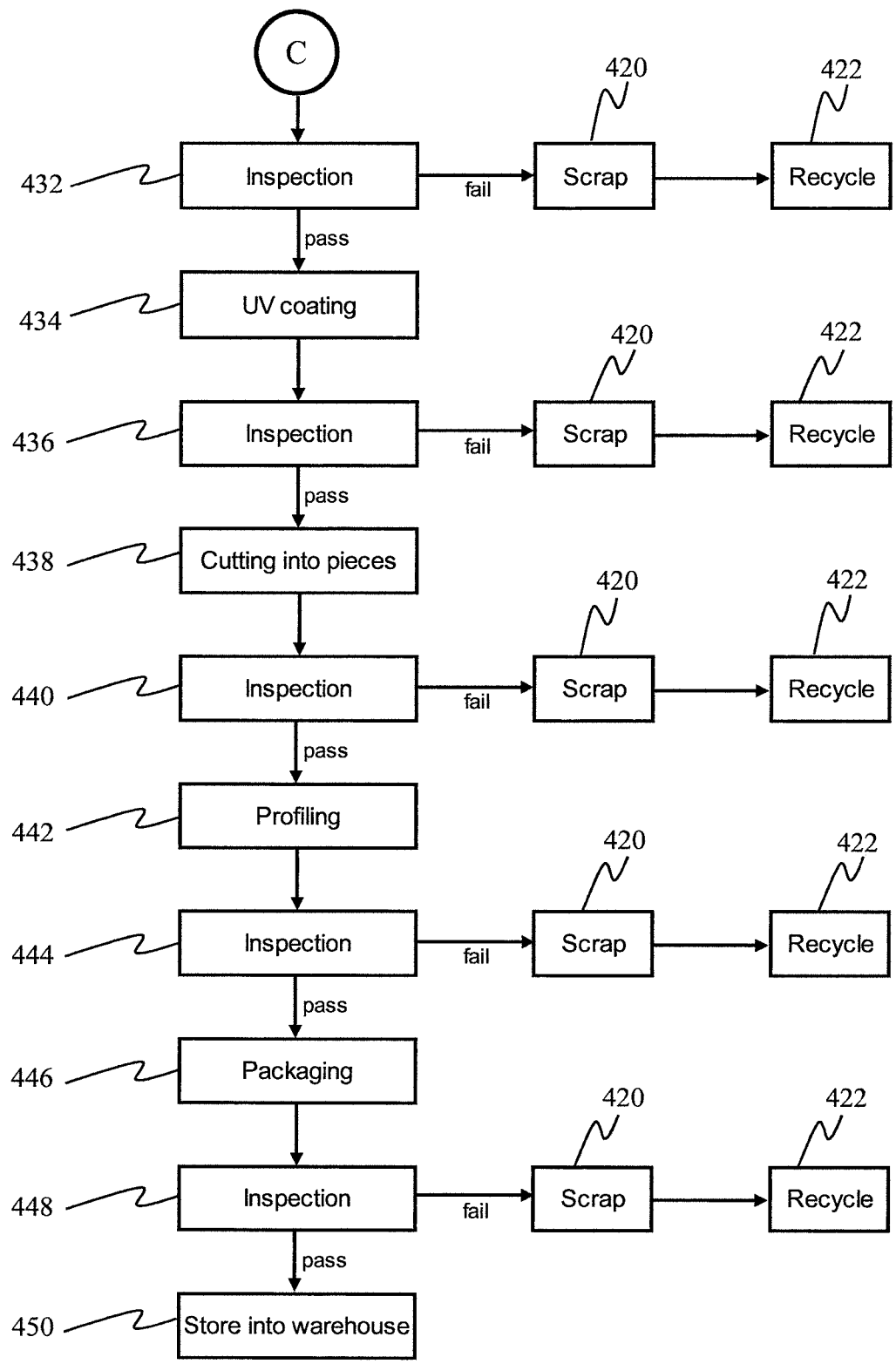

FIGS. 7A-7B set forth an exemplary manufacturing method to manufacture the board illustrated in FIG. 6. This method may be similar to the methods previously described, with the following modifications. In order to provide for the three co-extruded layers 4C, 5C, and 6C, the raw material for these layers is weighed and mixed according to the ratio of the three co-extruded layers. The steps illustrated and described in FIG. 4 may be used to receive, inspect, weigh, and mix the raw materials, except now two processes, Line I and Line II that are used in parallel to supply the co-extrusion process with the two different layer formulations. In each line, the raw materials are combined in the mixer and heated while stirring to 110-120° C., then cooled to 40° C. The cooled mixture may then be added to the extruder, 710. To form the composite structure comprising layers 4C, 5C, and 6C described previously, the material from Line I is used to form the middle layer 5C, and the material from Line II is used to form both of the outside layers 4C and 6C. The extruder may be a double-screw three-layer co-extrusion extruder unit operated at a constant (relatively high) speed and constant temperature, for example. The two different PVC mixtures from Line I and Line II are extruded in concert to form the composite structure.

The compound structure thus formed is then combined with other layers. In this embodiment layers are assembled in order from the top, wear-resistant layer 424, PVC simulation pattern layer 426, the three co-extruded layer structure 4C-6C, and self-priming soft layer 728, to form a structure now comprising six layers. These are combined together in compound molding step 730. A multi-roll machine may be used for the six-layer composite structure rolling. As before, a fully or partially transparent wear layer may include a surface texture to simulate a surface suggested by the underlying pattern, which is visible through the wear layer.

The method further includes steps of cooling 414, cutting into slabs 416, and inspection and testing the six composite structure of the PVC board. The surface of the PVC layer of the six-layer composite structure may be UV-cured to form a UV coating (434) to obtain a seven-layer composite PVC board, panel, or plate. The seven-layer composite structure of the PVC board may then be treated as illustrated and described in connection with FIG. 4B. Other steps such as testing, cutting, slotting edges to fit together or other machining, inspection, packaging, and storage of intermediate or finished products may be included in the method when and where they are deemed desirable in a particular environment or in connection with producing a particular product. The previously described method, including steps of obtaining a plurality of slab layers selected for their specific physical characteristics, assembling the layers in a select order, and hot-pressing the assembled layers to fuse them together as a compound plate, may alternatively or additionally be used.

In summary, the embodiments described above provide a PVC-based product that may be manufactured simply and efficiently, combining in a single production line or process any desired number of layers that provide any desired combination of the layers' physical characteristics, including shock absorption, thermal insulation, sound insulation, resistance to impact, compressibility, and the like. As noted previously, in embodiments composite slabs or pieces may be formed as described above, but with additional processing steps. Such steps may be performed as the material moves through the production line, still within a single production process. Such processing steps may include, for example, tempering the composite material by one or more additional heating-cooling steps, and/or pulling and stretching steps, at any appropriate point in the production line. The composite may also be cut, molded, pressed, profiled, planed, polished, and/or otherwise handled, to form any desired profile or other desired solid or hollow shape. The product can also be provided with any desired surface simulation or finish.

Although composite sheets with certain distinct layers have been described, the form of the finished product does not need to be a flat sheet, slab, or piece. And, it does not need to have only three, four, five, six, or seven layers. Instead, any number of layers can be formed into any number of shapes by including the needed steps in the manufacturing process. Nevertheless, the foregoing currently preferred embodiments produce flat PVC boards having a plurality of layers suitable for use as a low maintenance flooring material that may be configured to have any one or more of a wide variety of properties that may be selected as desired for use in a particular application.

Numerous alterations of the structure herein disclosed will suggest themselves to those skilled in the art. The present disclosure relates to embodiments of the invention that are described for purposes of illustration only. The described embodiments are not to be construed as limiting the invention unless the limitation is specifically noted as such in the disclosure. Modifications which do not depart from the spirit of the invention are intended to be included within the scope of invention as defined in the appended claims.

What is claimed is:

1. A board comprising:
   a PVC self-priming soft layer;
   a PVC thermal insulating layer permanently coupled to the self-priming soft layer;
   a film as a presentation layer permanently coupled to the insulating layer;
   a transparent wear layer permanently coupled to the insulating layer; and
   a polyurethane (PU) top layer;
   wherein the thermal insulating layer is a composite layer having three layers, including first and third layers made according to a first formula, and a second layer made according to a second formula, wherein the first formula comprises by weight:
   100 parts of polyvinyl chloride (PVC) resin;
   0-10 parts PVC elastic impact modifier;
   100-200 parts of calcium carbonate;
   5-7 parts calcium and zinc complex stabilizer; and
   1.0-2.0 parts lubricant;
   and wherein the second formula comprises by weight: 100 parts of polyvinyl chloride (PVC) resin;
   0-10 parts PVC elastic impact modifier;
   100-150 parts calcium carbonate;
   5-8 parts calcium and zinc compound stabilizer;
   0.2-1.0 parts foaming agent;
   0-8 parts foam adjusting agent; and
   1.0-2.0 parts lubricant.

2. The board of claim 1, wherein the PU layer is formed independently of other layers as a separate layer.

3. The board of claim 1, wherein the PU layer is formed by spraying liquid PU on a top surface of another layer.

4. The board of claim 1, wherein at least one surface of the board is embossed.

5. The board of claim 1, wherein:
   the presentation layer simulates the appearance of a building material that is not PVC, and
   the top surface of the wear layer is embossed prior to application of the PU layer with a texture simulating the texture of the building material simulated by the presentation layer.

* * * * *